United States Patent
Bittencourt et al.

(10) Patent No.: US 9,365,785 B2
(45) Date of Patent: Jun. 14, 2016

(54) STEAM REFORMING PROCESS FOR REDUCING THE TAR CONTENT OF SYNTHESIS GAS STREAMS

(71) Applicant: PETROLEO BRASILEIRO S.A. - PETROBRAS, Rio de Janeiro, RJ (BR)

(72) Inventors: Roberto Carlos Pontes Bittencourt, Rio de Janeiro (BR); Cristina Pontes Bittencourt Quitete, Rio de Janeiro (BR); Mariana de Mattos Vieira Mello Souza, Rio de Janeiro (BR)

(73) Assignee: PETROLEO BRASILEIRO S.A.-PETROBRAS, Rio de Janeiro, RJ (BR)

( * ) Notice: Subject to any disclaimer, the term of this patent is extended or adjusted under 35 U.S.C. 154(b) by 0 days.

(21) Appl. No.: 14/115,386

(22) PCT Filed: May 29, 2013

(86) PCT No.: PCT/BR2013/000190
§ 371 (c)(1),
(2) Date: Nov. 4, 2013

(87) PCT Pub. No.: WO2014/190400
PCT Pub. Date: Dec. 4, 2014

(65) Prior Publication Data
US 2015/0184094 A1 Jul. 2, 2015

(51) Int. Cl.
*C10K 1/34* (2006.01)
*C10K 3/02* (2006.01)
(Continued)

(52) U.S. Cl.
CPC . *C10K 1/34* (2013.01); *B01J 23/78* (2013.01); *B01J 35/002* (2013.01); *B01J 35/0006* (2013.01); *C01B 3/58* (2013.01); *C10K 3/023* (2013.01); *C01B 2203/0233* (2013.01); *C01B 2203/048* (2013.01); *C01B 2203/0435* (2013.01);
(Continued)

(58) Field of Classification Search
CPC .... C10K 1/34; C10K 1/02; C01B 2203/0233; C01B 2203/1011; C01B 3/40; C01B 3/382; B01J 2208/0053; B01J 23/78
See application file for complete search history.

(56) References Cited

U.S. PATENT DOCUMENTS

| 4,046,523 A * | 9/1977 | Kalina et al. ................ 48/197 R |
| 2009/0118119 A1* | 5/2009 | Ratnasamy et al. .......... 502/303 |
| 2009/0196822 A1* | 8/2009 | Garg ..................... B01J 23/002 423/654 |

FOREIGN PATENT DOCUMENTS

| BR | 1105737 A2 | 10/2013 |
| CN | 101332428 A | 12/2008 |

(Continued)

OTHER PUBLICATIONS

Gao et al. "Nickel catalysts supported on barium hexaaluminate for enhanced CO mehtanation", 2012, Industial & engineering chemisty research, 10345-10353.*

*Primary Examiner* — Stanley Silverman
*Assistant Examiner* — Syed Iqbal
(74) *Attorney, Agent, or Firm* — Sughrue Mion, PLLC

(57) ABSTRACT

The invention described herein proposes steam reforming processes in two stages, the first stage being passing a synthesis gas stream through a first catalyst bed comprising an alkali metal and/or iron titanate based catalyst, and a second stage comprising at least a second catalyst bed containing a refractory supported metal catalyst, preferably having NiO as the metal phase supported with barium hexa-aluminate.

11 Claims, 4 Drawing Sheets

(51) Int. Cl.
*C01B 3/58* (2006.01)
*B01J 35/00* (2006.01)
*B01J 23/78* (2006.01)

(52) U.S. Cl.
CPC . *C01B 2203/1041* (2013.01); *C01B 2203/1047* (2013.01); *C01B 2203/1252* (2013.01); *C01B 2203/141* (2013.01); *C01B 2203/146* (2013.01); *C10J 2300/0916* (2013.01); *Y02P 20/145* (2015.11)

(56) References Cited

FOREIGN PATENT DOCUMENTS

| | | |
|---|---|---|
| JP | 2006-68723 A | 3/2006 |
| JP | 2009-45597 A | 3/2009 |
| WO | 01/89687 A1 | 11/2001 |

\* cited by examiner

STEAM REFORMING PROCESS FOR REDUCING THE TAR CONTENT OF SYNTHESIS GAS STREAMS

CROSS REFERENCE TO RELATED APPLICATIONS

This application is a National Stage of International Application No. PCT/BR2013/000190 filed May 29, 2013, the contents of which are incorporated herein by reference in their entirety.

FIELD OF THE INVENTION

The present invention pertains to the field of processes for reducing the tar content in synthesis gas streams, particularly those streams from biomass gasification. The process consists of passing a synthesis gas stream through a sequence of two or more catalyst beds, the first catalyst bed comprising a catalyst based on alkali metal and/or iron titanates, and the other beds comprising a refractory supported metal catalyst.

THE BASIS OF THE INVENTION

Synthesis gas is the name given to the mixture in a varied proportion of CO and $H_2$, and may also contain small amounts of $CO_2$, $CH_4$ and $N_2$.

When suitably purified, it can be used in industrial processes for producing ammonia, methanol, liquid hydrocarbons (Fischer-Tropsch process), and several others.

The synthesis gas is also an intermediary in the production of $H_2$, which is used to a great extent in the refining processes, such as hydrotreatment and hydro-cracking, as well as various processes of hydrogenation and fuel cells, among others.

Usually, the synthesis gas is produced from non-renewable sources, such as natural gas, liquefied petroleum gas (LPG), naphtha, or coal.

Thus, a great effort is being expended to produce synthesis gas from renewable sources and agricultural waste, in an economically sustainable manner, and with a particular emphasis on biorefining.

A promising route for producing synthesis gas from biomass is gasification, using oxidizing agents such as air, $O_2$, $CO_2$ or water. However, one of the major technical difficulties in achieving industrially viable processes for biomass gasification is the presence of tar as a contaminant of the produced synthesis gas.

Tar is defined as a group of hydrocarbons with a molecular weight greater than that of benzene. These aromatic compounds are difficult to remove and their condensation can cause deposits and obstruction of equipment used in the processes utilizing the synthesis gas derived from the biomass gasification. Moreover, their presence can promote deactivation of the catalysts.

The prior art describes a number of methods for removing tar from the synthesis gas generated by biomass gasification, such as scrubbers, electrostatic precipitation, cyclones, or fixed bed filters containing tar adsorption materials.

These methods, however, have drawbacks such as low removal efficiency, high costs or generation of liquid or solid waste requiring subsequent treatment.

A method under development for removing tar from synthesis gas generated by the biomass gasification is the catalytic conversion of tar by means of a steam reforming reaction. Under this procedure, the tar reacts with water vapor in the synthesis gas in the presence of a catalyst, and is then transformed into lighter products, such as CO, $CO_2$, $H_2$ and $CH_4$.

This procedure offers several advantages, such as high energy efficiency, since it is not necessary to reduce the temperature of the synthesis gas prior to the stage of catalytic conversion of the tar and the absence of effluent liquid. Thus, the major technical challenge of this procedure is the development of a catalyst resistant to deactivation due to sulfur and carbon deposition ("coking") for use in a fixed bed.

Know-how described in the prior art teaches the use of various types of catalysts for the catalytic removal of tar with steam, due to its excellent initial activity.

Commercial catalysts for steam reforming of hydrocarbons are based on NiO supported with materials such as alumina, calcium aluminate, magnesium aluminate or a mixture thereof, and can be promoted by variable amounts of alkali metals, such as potassium or rare earths, such as lanthanum. The use of these materials, however, is limited due to loss of activity, particularly attributable to coke formation.

The study of the process of reforming steam from five aromatic compounds commonly found in tar, namely, benzene, toluene, naphthalene, anthracene and pyrene, with a commercial catalyst for reforming steam for naphtha demonstrated the need to use high temperatures and steam/carbon (mol/mol) ratios to minimize coke formation.

BR PI 1105737-8 describes the use of the steam reforming process for removing tar from gasification processes prepared from a hexa-aluminate type base, preferably hexa-aluminate from alkaline earth metals or from rare earth, with incorporated nickel oxide. Though this catalyst is efficient in that it exhibits excellent activity properties and resistance to coke deposition, it is expensive to produce due to the incorporation of nickel; hence it would be desirable to use a lower cost material as a guard bed for extending the useful life of the metallic phase containing catalyst.

It also demonstrated the use of naturally occurring calcium and magnesium ore (dolomite), which may contain minor and variable amounts of other impurities (such as iron) for the catalytic reduction of tar. Though inexpensive, dolomite has drawbacks that limit its industrial use, as it only becomes active at temperatures above 800° C., has low mechanical strength, low resistance to coke formation and loses activity in environments with high $CO_2$ pressure due to the formation of $CaCO_3$.

Another group of inexpensive materials is the calcites group. However, its use is complicated in a hydrogen-rich environment, such as those in which gasification processes occur. Hydrogen can be adsorbed in a dissociative manner in active sites with calcined calcite, blocking the active sites of the surface of the CaO and causing decreased catalyst activity.

Clay minerals and iron oxides are cheap and available, but have low catalytic activity compared to dolomite.

The clay minerals of the kaolinite and montmorillonite group have low thermal resistance in the range of 800° C. to 850° C. and ferrous minerals (such as hematite, magnetite, siderite and pyrite) are less active than dolomite, quickly deactivating in the absence hydrogen.

Other calcium or iron based minerals were also tested as an alternative to dolomite, such as olivine.

Olivine is a mineral containing MgO, $Fe_2O_3$ and $SiO_2$ that has the advantage of greater resistance to attrition. However, it exhibits less surface area, thus reducing its tar removal activity.

The use of materials containing iron oxides of the limonite group, formed by oxidation of iron containing minerals, becomes inappropriate due to crystalline changes of the material, resulting in a loss of the material's mechanical strength.

The prior document CN 101332428 describes the use of a clay mineral as catalyst support containing NiO (3% m/m-30% m/m), $Fe_2O_3$ (3% m/m-20% m/m), $Al_2O_3$ (3% m/m-25% m/m) and $K_2O$ (1% m/m - 10% m/m). The catalyst is applied in the stage reforming the tar steam from the gas produced in the gasification of biomass or coal.

The document JP 2009045597 discusses the use of a sulfur resistant catalyst for reducing tar content, this catalyst being a mixture of iron oxide, dolomite and nickel oxide. In this case, the dolomite easily loses activity, some of the causes being its low thermal resistance, leading to sinterization and its low mechanical resistance. In addition, dolomite can lose activity due to formation of carbonate, caused by high concentration of carbon dioxide in the gasification stream.

The document WO 0189687 describes the use of olivine as a support for catalysts containing Ni, used as a biomass combustion fluidizing agent.

In turn, in the document JP 2006068723, a combination of dolomitic minerals containing 5% w/w-30% w/w of NiO is employed in the gasification of biomass.

Thus, although there are several lessons in the prior art of using a low cost material, without the addition of the metallic phase for use in steam reforming processes aimed at catalytic removal of tar, there remains a need to find a material that has the desired properties of high activity and stability and adequate mechanical strength.

Surprisingly, the present invention describes processes for reforming steam using catalyst beds based on materials selected from the titanates group in association with catalyst beds containing supported metal catalysts, the objective of which is to reduce the tar content in gas synthesis streams.

SUMMARY OF THE INVENTION

The invention described herein discloses a process of steam reforming to reduce the tar content of synthesis gas streams coming from biomass gasification processes.

This process utilizes two catalyst beds, a first bed containing catalysts based on titanates, preferably alkali metal titanates such as barium and calcium, and iron titanates, or a mixture thereof, and a second catalyst bed comprised of a refractory supported metallic catalyst.

The titanate-based catalysts have high activity and stability when applied to processes of steam reforming for reducing the tar content of the synthesis gas streams coming from biomass gasification processes, in particular when compared to catalysts already known in the prior art, such as dolomite.

The association of a catalyst bed based on alkali metal and/or iron titanates with a catalyst bed containing refractory supported metal catalysts has the advantage of attaining conversions greater than 70%; moreover the titanate bed serves as a guard bed, preventing deactivation of the refractory supported metal catalysts, ultimately increasing its useful life, and consequently reducing the catalyst replacement, making the process less expensive.

DETAILED DESCRIPTION OF THE INVENTION

Figure 1:
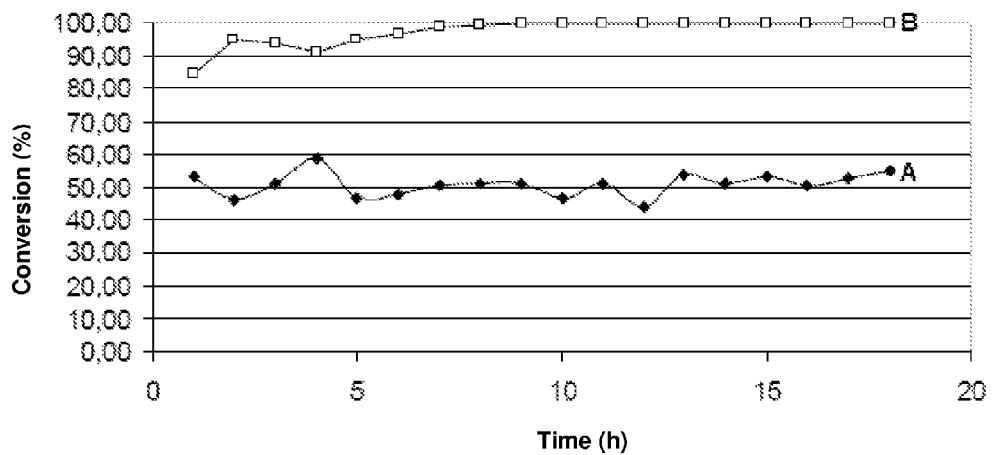
FIG. 1 graphically depicts the stability result of the catalyst of the iron titanate group in removing tar in the presence of steam at temperatures of 650° C. (A) and 800° C. (B).

It describes the reduction of tar content of synthesis gas streams in steam reforming processes with the aid of at least two catalyst beds, a first catalyst bed comprising a catalyst based on alkali metal and/or iron titanates, followed by at least a second catalyst bed comprised of a refractory supported metallic catalyst.

The synthesis gas streams treated, according to the process described herein are, preferably, synthesis gas streams coming from biomass gasification processes, particularly biomass from renewable sources.

In this context, the renewable-source biomass can be selected from, but not limited to the group comprising: sugarcane straw and bagasse, and waste from the production of bio-diesel from palm, babassu and macaw, or a mixture thereof.

With respect to the catalysts, the titanates useful to this invention are inorganic compounds containing oxides of titanium in their composition and having a high melting point and low thermal conductivity at high temperatures. They are perovskite type materials with the chemical formula $ABO_3$, where A and B are mesh forming elements, such as $BaTiO_3$.

Among these, catalysts based on alkali metal titanates, such as barium titanate ($BaTiO_3$) and calcium titanate ($CaTiO_3$), or iron titanate ($FeTiO_3$)) are preferably used.

The materials may be obtained by conventional preparation methods, such as co-precipitation, drying and calcination at high temperature, or preferably comprised of naturally occurring ores, such as ilmenite (iron titanate), improved by typical industry mining processes, such as grinding.

In the case of the refractory supported metal catalysts used in the second catalyst bed, of particular interest are the catalysts containing Ni, Pt, Rh or combinations thereof as a metal phase, supported on a refractory compound selected from among: aluminas, hexa-aluminates, titanates, magnesium zirconates and aluminates, barium, calcium, potassium, lanthanum, and mixtures thereof.

Among the preferably used hexa-aluminates are the hexa-aluminates of alkali metals or of rare earths, particularly hexa-aluminates Sr, Ba, Ca, K, Mg, La, Ce, Pr, Gd, or mixtures thereof, more preferably barium hexa-aluminate.

In the preferred embodiment, according to the invention, the catalyst beds can be distributed into two or more coke-fired fixed reactors in series, where the first reactor has a catalyst bed comprising alkali metal and/or iron titanates based catalysts, followed by at least one reactor with a catalyst bed comprising a refractory supported metallic catalyst.

The first catalyst bed containing catalysts based on alkali metal and/or iron titanates has a dual role:
i) Removal of tar, inasmuch as such catalysts have high activity for the conversion of tar to hydrogen, CO and $CO_2$ as illustrated in the examples 3, 4 and 5;
ii) It acts as a "guard bed," due to of its high stability, preventing the deactivation of the catalyst in the second bed, particularly in the case of Ni/ barium hexa-aluminate catalysts.

The use of the first bed as "guard bed" is justified because the catalysts that have nickel oxide as their metallic phase sustain severe deactivation in steam reforming processes, in particular for treating streams from biomass gasification. This deactivation is caused by various factors, such as, for example, the presence of sulfur, chlorine and alkali metals in the streams containing the gasification product.

This association of catalyst beds, where the proportion by mass of the titanate based catalyst bed, in relation to the metal catalyst catalytic bed is between 20% and 50%, leads to a tar conversion of greater than 70%, as illustrated in Example 6.

In another embodiment, the first catalyst bed can be used to fully or partially replace inert materials, such as sand or lower performance catalytic materials, such as dolomite or magnesite used in fluidized or moving beds of biomass gasification processes, since the materials, according to the invention, exhibit high activity and stability, even at high temperatures, such as those used in conventional biomass gasification processes, which are between 700° C. and 850° C., and as illustrated in the examples 3, 4 and 5.

In the case of the present invention, both the first and the second catalyst bed are based on a steam reforming reaction for the removal of tar, utilizing the excess steam generated in the gasification process and the high outlet temperatures of these processes. Appropriate conditions are temperatures between 600° C. and 850° C., a molar steam/carbon ratio between 1.5 mol/mol and 5.0 mol/mol and pressures ranging from 0.5 kgf/cm² to 50 kgf/cm².

EXAMPLES OF THE INVENTION

The below described examples are presented in order to better illustrate the nature of the invention, as well as the ideal way to implement it. However, they cannot be considered to limit its scope.

Example 1

Barium and Calcium Titanate Based Catalysts

The barium titanate based catalyst exhibited a minimum purity of 99.1% and contained maximum alumina contents of 0.20%, $SiO2_2$ of 0.15%, $Fe_2O_3$ of 0.05 and $Na_2O$ of 0.10.

The calcium titanate based catalyst had a minimum purity of 99.1% and contained maximum alumina contents of 0.20%, $SiO2_2$ of 0.20%, $Fe_2O_3$ of 0.05 and $Na_2O$ of 0.10.

Its surface areas are respectively, 0.90 m²/g and 13.6 m²/g, as determined by the nitrogen absorption technique.

X-ray diffraction analysis confirmed that the main crystalline phase of the catalysts was barium titanate and calcium titanate, and X-ray fluorescence analysis showed that they contained minor impurities, as may be observed in Table 1 below.

TABLE 1

| Characterization by X-ray diffraction and X-ray fluorescence | |
|---|---|
| Main crystalline phases identified | FRX (% m/m) |
| $BaTiO_3$ | Ba = 53 |
| | Ti = 23 |
| | Na = 0.9 |
| | Sr = 0.7 |
| | Zr, S, Ca, P, Si < 0.1 |
| $CaTiO_3$ | Ti = 36 |
| | Ca = 27 |
| | Zr = 0.8 |
| | Si = 0.2 |
| | Sr = 0.1 |
| | Ba = 0.1 |
| | Mg, Fe, P, Al, Cl, S < 0.1 |

Example 2

Iron Titanate (Ilmenite) Based Catalysts

The iron titanate based catalyst exhibits a surface area of 5.4 m²/g as determined by the nitrogen adsorption technique.

X-ray diffraction analysis confirmed that the main crystalline phase of the catalysts exhibited $FeTiO_3$ and $Fe_2TiO_3$, and X-ray fluorescence analysis showed the presence of minor components, such as Mn, Si, Mg and Zr, as may be observed in Table 2 below.

TABLE 2

| Characterization by X-ray diffraction and X-ray fluorescence | |
|---|---|
| Main crystalline phases identified | FRX (% m/m) |
| $FeTiO_3$ and $Fe_2TiO_3$ | Fe = 29 |
| | Ti = 31 |
| | Al = 1.2 |
| | Mn = 1.0 |
| | Si = 0.8 |
| | Mg = 0.2 |
| | Zr = 0.1 |
| | S, Ca, P, Pb, As, Nb < 0.1 |

Example 3

Activity of the Catalysts Using a Single Bed

In the experiments conducted for measuring the catalytic removal activity of the tar, the tar was simulated using toluene, to facilitate analysis of the reaction products.

Toluene and water were separately fed to the unit, vaporized and mixed with nitrogen, used as carrier gas and fed at a flow rate of 10 ml/min.

The reaction products were analyzed on-line by chromatography using a gas chromatograph with two thermal conductivity detectors and a flame ionization detector The reaction pressure was kept constant at 4 atm and the steam/carbon ratio was 1.5 mol/mol, with the temperature being varied during the experiments between 500° C. and 700° C.

The results of the catalytic removal of tar in the presence of water vapor (measured by the toluene conversion) are shown in Table 3 below.

TABLE 3

Tar Removal Activity
(temperature equal to 650° C. and atmospheric pressure)

| Type of catalyst | X % |
|---|---|
| Barium titanate | 30 |
| Iron titanate | 44 |
| Calcium titanate | 51 |

The results in Table 3 show that the catalysts, according to the invention, belonging to the group of alkali metal or iron titanates, have tar removal activity greater than 30% in the presence of water vapor when a single bed is used.

Materials belonging to the dolomite group, known in the prior art, exhibit a conversion rate of less than 20%, in addition to the adverse effect of obstruction of the reactor, which can be explained by the low resistance to coking and/or crystalline changes occurring in the material at temperatures below 650° C. in the absence of hydrogen as a reaction product.

Example 4

Activity and Stability of Iron Titanate Based Catalysts Using a Single Bed

Figure 2:
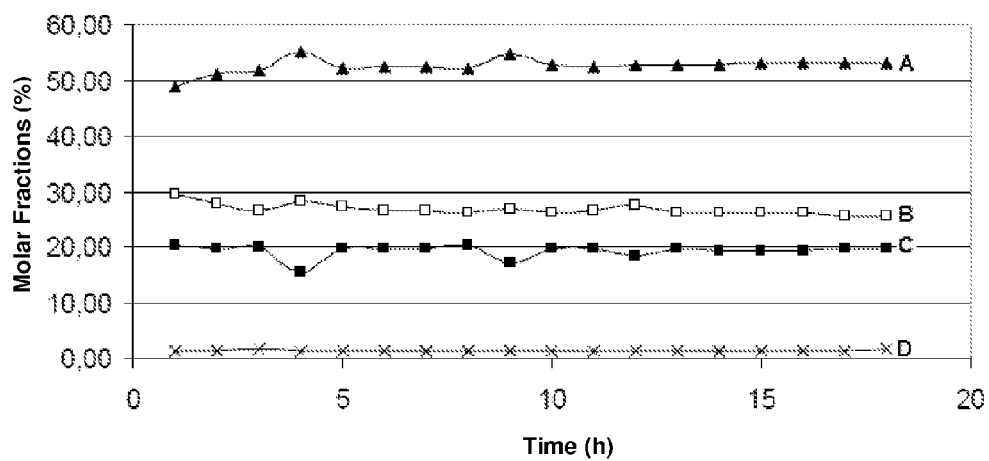
FIG. 2 graphically represents the molar fractions of carbon dioxide (A), carbon monoxide (B), hydrogen (C) and methane (D) obtained in the reaction of steam reforming of the toluene at 650° C. of the catalyst of the iron titanate group according to the invention.
Figure 3:
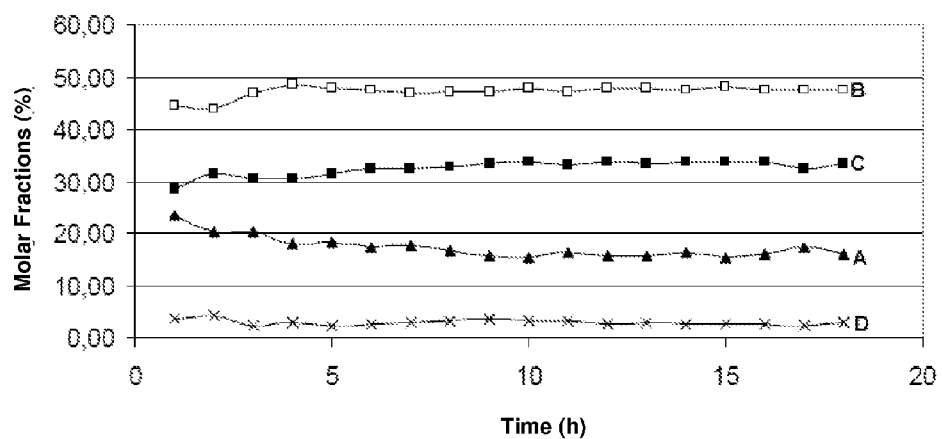
FIG. 3 graphically represents the molar fractions of carbon dioxide (A), carbon monoxide (B), hydrogen (C) and methane (D) obtained in the reaction of steam reforming of the toluene at 800° C. of the catalyst of the iron titanate group according to the invention.

As is apparent in FIGS. 1 to 3, the iron titanate based catalysts have high stability and activity at low (650° C.) or high temperature (800° C.).

This characteristic favors their use in both the main bed of the gasifier, fully or partially replacing inert materials used to increase heat transfer in this type of process, as in a fixed bed, preferably followed by a catalyst containing a metal phase, such as nickel, in order to achieve a nearly 100% conversion of the tar.

As may be observed in the Figures, the carbon dioxide yield decreases as the temperature rises. However, the $H_2/CO$ ratio obtained in the two conditions is maintained in the same range, that is, between 0.7 and 0.8.

Example 5

Figure 4:
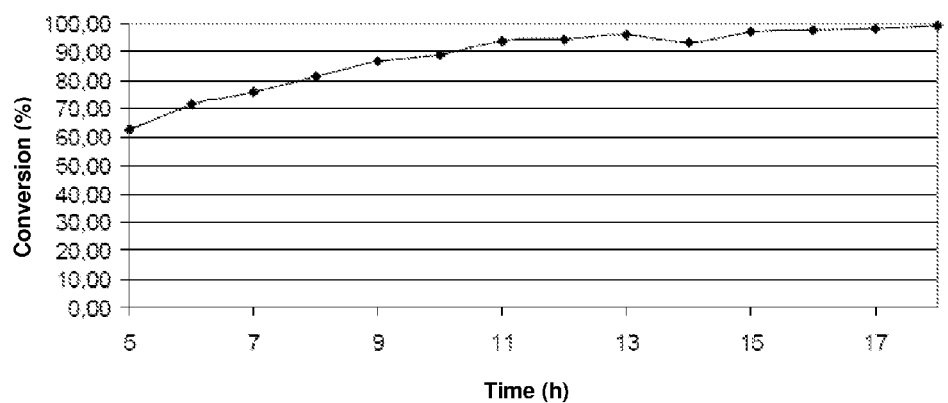
FIG. 4 graphically represents the results of the activity and stability of the calcium titanate type catalyst in removing tar by the steam reforming reaction at a temperature of 800° C.
Figure 5:
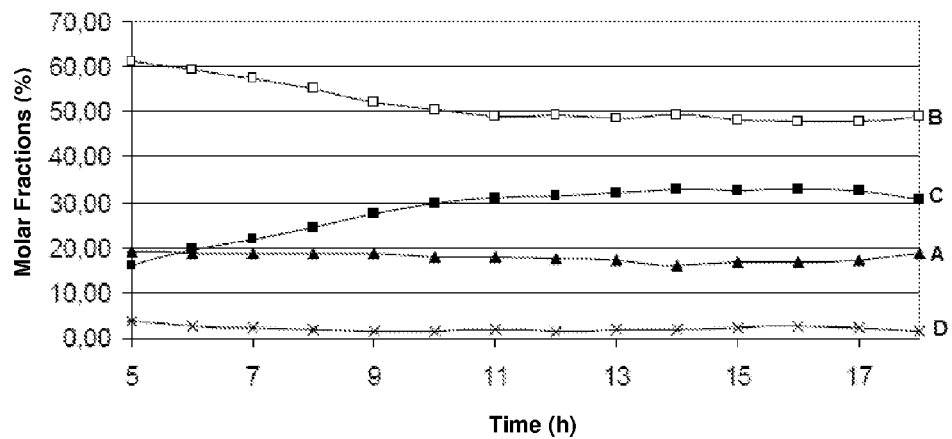
FIG. 5 graphically represents the molar fractions of carbon dioxide (A), carbon monoxide (B), hydrogen (C) and methane (D) obtained in the reaction of steam reforming of the toluene at 800° C. of the catalyst of the calcium titanate group according to the invention.

Activity and Stability of Alkali Metal Titanate Based Catalysts Using a Single Bed Alkali metal titanate based catalysts have high tar removal activity without signs of deactivation. FIGS. 4 and 5 show the results of a test lasting 18 hours for the calcium titanate type catalyst at a temperature of 800° C.

Example 6

Activity and Stability of the Calcium and Barium Titanate Type Catalyst for Removal of Tar in a Composite Bed Followed by a Catalyst Containing a Metallic Phase To assess the activity, the catalyst bed comprised 100 mg of calcium or barium titanate followed by 200 mg of NiO/barium hexa-aluminate type catalyst.

The other reaction conditions used were a temperature of 650$^2$C, steam/carbon ratio of 1.5 mol/mol and total flow rate of 100 mL/min.

Table 4 below presents the results obtained from the tests conducted on the calcium titanate based catalyst.

TABLE 4

Tar Removal Activity

| Type of Catalyst | Mass (mg) | X % |
|---|---|---|
| Calcium titanate | 300 | 51 |
| Calcium titanate associated with a NiO/barium hexa-aluminate type catalyst | 100 + 200 | 100 |

As may be observed, the use of a bed comprised of a first fraction of calcium titanate followed by a second catalyst fraction containing a metallic phase make it possible to obtain an almost 100% tar removal activity, with the advantage of reduced costs.

Figure 6:
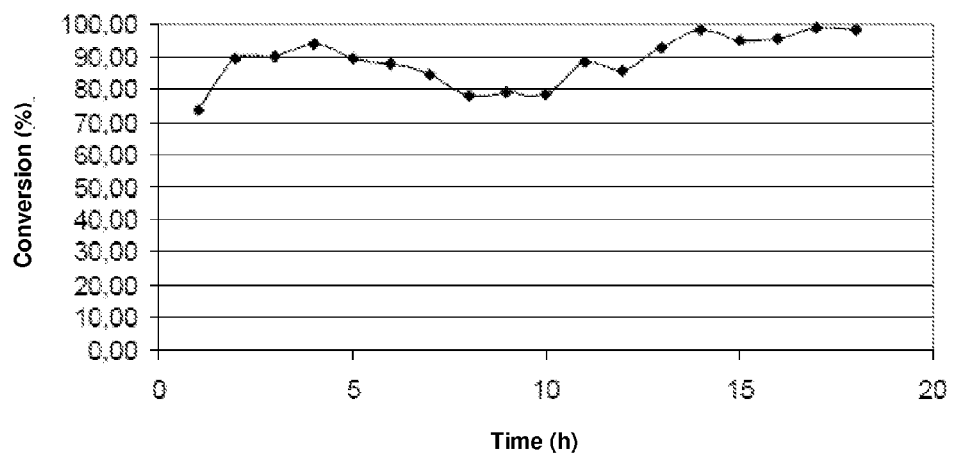
FIG. 6 graphically depicts the stability results of the compound bed, according to the invention, comprised of 33.3% of the calcium titanate catalyst and 66.6% of the NiO/ barium hexa-aluminate type catalyst in the removal of tar in the presence of water vapor at 650° C.
Figure 7:
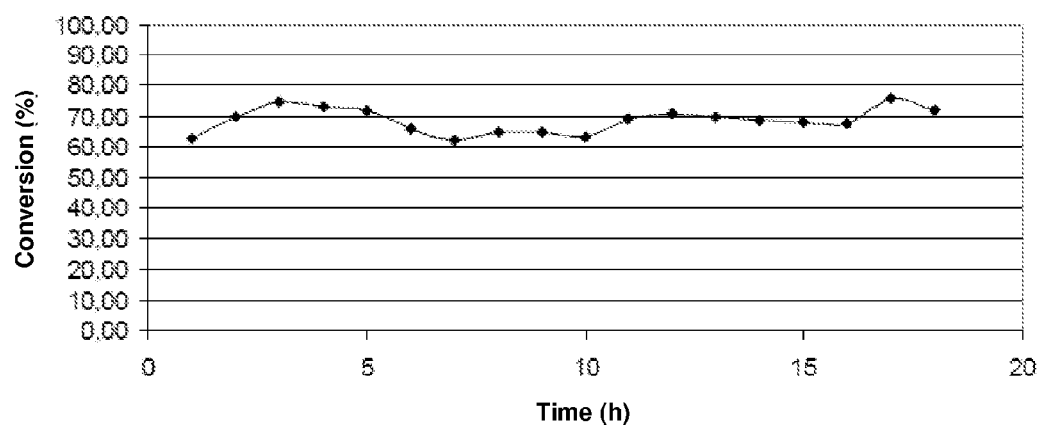
FIG. 7 graphically depicts the stability results of the compound bed, according to the invention, comprised of 33.3% of the barium titanate catalyst and 66.6% of the NiO/ barium hexa-aluminate type catalyst in the removal of tar in the presence of water vapor at 650° C.

FIGS. 6 and 7 illustrate that the composite bed, according to the invention, comprised of an initial fraction of calcium and barium titanate type catalyst, respectively, followed by a catalyst fraction containing a metallic phase, has high tar gasification activity and stability in the presence of water vapor.

The invention claimed is:

1. A steam reforming process for reducing the tar content of synthesis gas streams, said process comprising:
    passing of a stream of synthesis gas through a first catalyst bed comprising an alkali metal titanate based catalyst and/or an iron titanate based catalyst, and
    passing of the stream of synthesis gas through a second catalyst bed containing a refractory supported metal catalyst,
    where the mass ratio between the catalyst beds is between 20 and 50 of titanates in relation to the metal catalyst.

2. The steam reforming process for reducing the tar content of synthesis gas streams, according to claim 1, characterized in that the synthesis gas is originally from biomass gasification processes.

3. The steam reforming process for reducing the tar content of synthesis gas streams, according to claim 2, characterized in that the biomass is selected from the group comprising: sugarcane straw and bagasse, and waste production of biodiesel from palm, babassu and macaw palms, or a mixture thereof.

4. The steam reforming process for reducing the tar content of synthesis gas streams, according to claim 1, characterized in that the alkali metal is barium.

5. The steam reforming process for reducing the tar content of synthesis gas streams, according to claim 1, characterized in that the alkali metal is calcium.

6. The steam reforming process for reducing the tar content of synthesis gas streams, according to claim 1, characterized in that the refractory support has NiO as the metallic phase.

7. The steam reforming process for reducing the tar content of synthesis gas streams, according to claim 1, characterized in that the refractory support of the metal catalyst is selected from: aluminas, hexa-aluminates, titanates, magnesium zirconates and aluminates, barium, calcium, potassium, lanthanum, and mixtures thereof.

8. The steam reforming process for reducing the tar content of synthesis gas streams, according to claim 1, characterized in that the refractory support of the metal catalyst is selected from hexa-aluminates of alkali metals or of rare earths, or mixtures thereof.

9. The steam reforming process for reducing the tar content of synthesis gas streams, according to claim 1, characterized in that the refractory support of the metal catalyst is an alkali metal hexa-aluminate which is a barium hexa-aluminate.

10. The steam reforming process for reducing the tar content of synthesis gas streams, according to claim 1, characterized in that the refractory support of the metal catalyst is selected from hexa-aluminates of: La and Ce.

11. The steam reforming process for reducing the tar content of synthesis gas streams, according to claim 1, characterized by the conventional operating conditions for the steam reforming process, where the temperature is between 600° C. and 850° C., the steam/carbon ratio between 1.5 and 5.0 and the pressure between 0 kgf/cm$^2$ and 50 kgf/cm$^2$.

* * * * *